(12) United States Patent
Takahashi

(10) Patent No.: US 6,611,658 B1
(45) Date of Patent: Aug. 26, 2003

(54) DISK DEVICE AND DISK DECELERATING AND STOPPING METHOD FOR THE SAME

(75) Inventor: Yorio Takahashi, Ehime (JP)

(73) Assignee: Matsushita Electric Industrial Co., Ltd. (JP)

( * ) Notice: Subject to any disclaimer, the term of this patent is extended or adjusted under 35 U.S.C. 154(b) by 6 days.

(21) Appl. No.: 09/889,893

(22) PCT Filed: Nov. 24, 2000

(86) PCT No.: PCT/JP00/08322

§ 371 (c)(1),
(2), (4) Date: Jul. 24, 2001

(87) PCT Pub. No.: WO01/39187

PCT Pub. Date: May 31, 2001

(30) Foreign Application Priority Data

Nov. 25, 1999 (JP) ............................................. 11-333539

(51) Int. Cl.⁷ .............................................. H02P 5/00
(52) U.S. Cl. ...................... 388/800; 318/138; 318/254; 318/432; 318/434; 318/439; 318/696; 360/75; 360/78.06
(58) Field of Search ................................ 318/138, 254, 318/432, 433, 434, 439, 696; 360/78.06, 75; 388/800

(56) References Cited

U.S. PATENT DOCUMENTS 5,834,913 A * 11/1998 Yoshida et al. ............. 318/270
5,914,581 A * 6/1999 Suzuki et al. ............... 318/798
6,198,590 B1 * 3/2001 Codilian et al. .......... 360/73.03
6,285,521 B1 * 9/2001 Hussein .................... 360/73.03

FOREIGN PATENT DOCUMENTS

| GB | WO 95/34070 | * 12/1995 | ........... G11B/19/00 |
| JP | 54-141114 | 11/1979 | |
| JP | 58-131194 | 9/1983 | |
| JP | 5-151700 | 6/1993 | |
| JP | 7-78409 | 3/1995 | |
| JP | 07-078409 | * 3/1995 | ........... G11B/19/28 |
| JP | 09-285174 | * 10/1997 | ............. H02P/6/08 |
| JP | 11-96649 | 4/1999 | |
| JP | 11-096649 | * 4/1999 | ........... G11B/19/22 |
| JP | 11-235066 | * 8/1999 | ............. H02P/3/08 |

* cited by examiner

Primary Examiner—Robert E. Nappi
Assistant Examiner—Tyrone Smith
(74) Attorney, Agent, or Firm—Parkhurst & Wendel, L.L.P.

(57) ABSTRACT

A decelerating method with low power consumption can be selected when rapid deceleration is not required. A disk can be stopped promptly and reliably even when a need arises for stopping the disk during deceleration of the disk by the method with low power consumption. In a disk device having a function of decelerating or stopping a rotating disk, depending on the kind of a command upon decelerating or stopping, the operation for decelerating or stopping is switched between a forced deceleration or stop operation by applying a reverse-directional voltage to a disk motor which rotates the disk so as to forcedly decelerate or stop the disk, and a power saving deceleration or stop operation with lower power consumption than the forced deceleration or stop operation so as to decelerate or stop the disk.

19 Claims, 2 Drawing Sheets

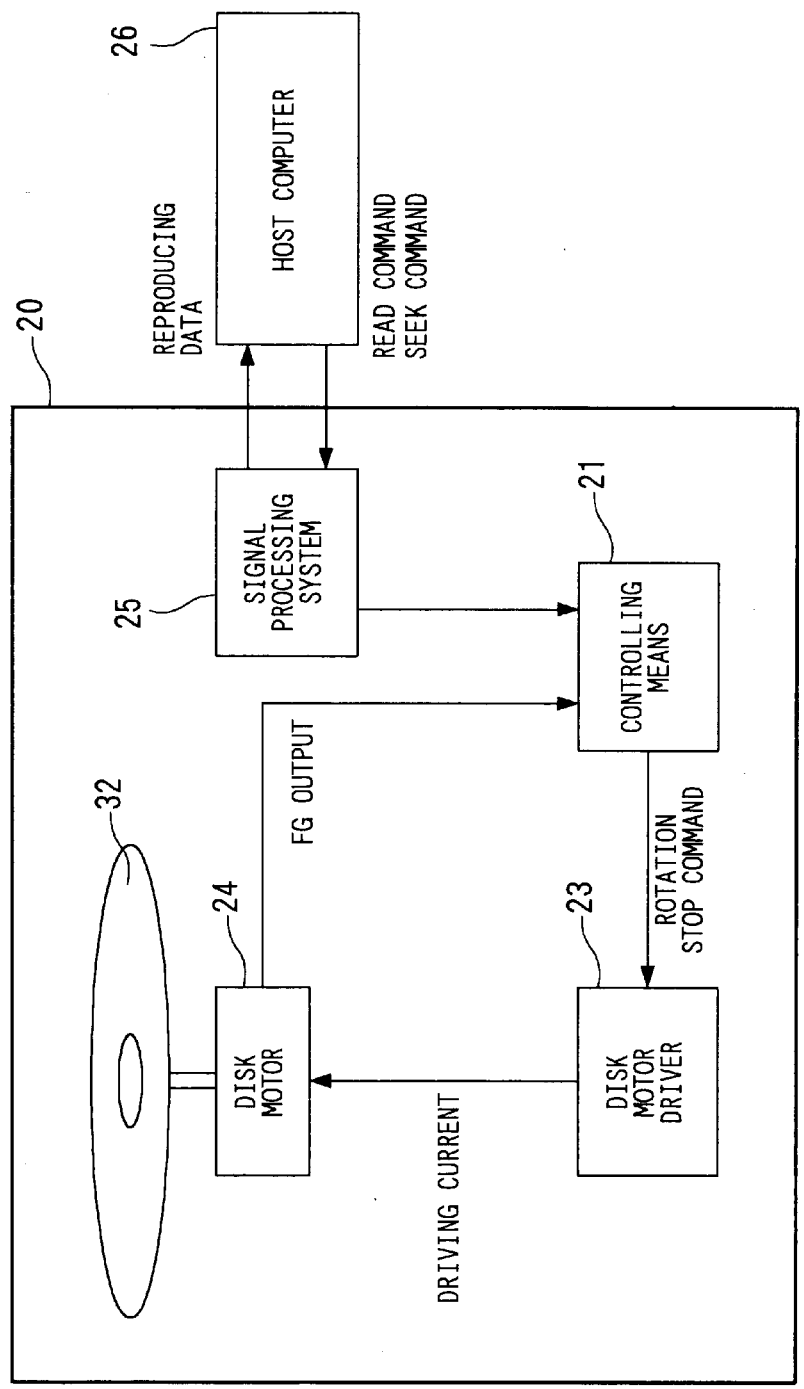

DISK DEVICE AND DISK DECELERATING AND STOPPING METHOD FOR THE SAME

TECHNICAL FIELD

The present invention relates to a drive for a disk (a recording medium in a disk shape) such as a CD-ROM, and more particularly to decelerating and stopping control of a motor which rotates the disk.

BACKGROUND ART

In a disk device 20 such as a CO-ROM drive having components shown in FIG. 2, when a disk motor driver 23 receives a command to decelerate or stop rotation of a disk 22 from a controlling means (CPU) 21 of the disk device 20, a reverse-direction voltage is applied from a disk motor driver 23 to disk motor 24 to exert a forced braking force for rapid deceleration. In the case where rotation of the disk motor 24 is decelerated by applying the reverse-direction voltage to the disk motor 24 to put on a brake as described above, that is, rotation of the disk motor 24 is decelerated in a so-called normal mode, current consumption is considerably high and the disk device 20 used in a portable computer, which-is required to save power, is affected significantly. Reference numeral 25 in FIG. 2 denotes a signal processing system provided in the disk device 20 and reference numeral 26 denotes a host computer for managing the disk device 20.

Added to the conventional disk device 20 are power saving functions such as a low-rotation mode and standby mode in light of enhancing the power saving effect. These are the functions of suppressing the power consumption by lowering a rotational speed of the disk motor 24 or bringing the disk motor 24 to a stop condition in compliance with decision by the CPU 21 when no access command such as a read command or seek command is issued by the host computer 26 for a predetermined time. In the portable computer, therefore, a shift to the low rotation mode or sleep mode is often produced and the fact that the high current is consumed by the deceleration of the disk motor 24 for each movement causes trouble.

Japanese Patent Laid-Open No. 11-96649 discloses a disk drive device of a configuration such that in the disk drive device for applying the reverse-direction voltage to a disk motor which rotates a disk to be forcedly stopped, the application of the reverse-direction voltage is suppressed in a power saving mode to inertially rotate the disk motor to be stopped. It also discloses a method of enhancing power saving effect without consuming high current for each shift to the sleep mode by inertially rotating the disk motor in a sleep mode also in a disk drive which shifts from a normal mode to the sleep mode to bring the disk motor to a stop condition when there is no access to the disk for a predetermined time.

As a method of rapidly decelerating and stopping the disk in lower power consumption, Japanese Patent Laid-Open No. 9-285174 discloses a method of decelerating the rotational speed of the disk by bringing a coil of a motor driver IC to a short-circuit condition during the deceleration and utilizing a reverse electromotive force of the motor and a method of compensating for reduction of the braking force at a portion where the reverse electromotive force at the time of a low rotation is reduced in combination with a reverse brake during the stop of the rotation.

However, in the disk drive device disclosed in Japanese Patent Laid-Open No. 11-96649 mentioned above, the power is saved by the inertial rotation during the stop of the disk in the power saving mode, and in addition to this, the drive also applies the reverse voltage to the motor for forced deceleration in such as shifting to the low rotation mode, which consumes extra power.

When applying the reverse voltage to the motor for stop, sometimes the disk is not completely stopped or is rotated in a reverse direction unless the reverse voltage is applied at an appropriate time and voltage corresponding to the current rotational speed and the disk weight. Namely, in the disk drive device disclosed in Japanese Patent Laid-Open No. 11-96649, the inertial rotation is carried out during the stop of the disk in the power saving mode, however, a signal for detecting the number of rotation of the disk is generally such that output from a hall element of the disk motor called FG is converted to pulses and its resolving power is six pulses per rotation of the disk in a three-phase motor which is common in the disk device so that it is difficult to detect the accurate rotational speed immediately before the stop of the rotation. If an ejecting command is issued at this time, the disk cannot be sometimes stopped rapidly and reliably for the reason described above. If the disk is ejected without being reliably stopped, its recording surface is likely to be scratched since existing CD-ROM and DVD-ROM devices are generally of the tray type, and the method of stopping the rotation of the disk more reliably and rapidly and further in the lower power consumption is required.

Moreover, as the method of rapidly decelerating and stopping the disk in the lower power consumption, in the method of decelerating the rotational speed of the disk by bringing the coil of the motor driver IC to the short-circuit condition during the deceleration and utilizing the reverse electromotive force of the motor and the method of compensating for the reduction of the braking force at the portion where the reverse electromotive force at the time of the low rotation is reduced in combination with the reverse brake during the stop of the rotation as disclosed in Japanese Patent Laid-Open No. 9-285174, there is a problem that the reverse electromotive force of the motor is consumed in the driver IC to thereby cause heat generation of the driver IC though not as much as in the method of applying the reverse voltage to the motor for the forced deceleration, and a problem arises that simply using this method is not perfect when the heat generation is desired to be suppressed as much as possible in compact equipment or the like.

DISCLOSURE OF INVENTION

The present invention solves the above problems and has its object to provide a disk device and a disk decelerating and stopping method of the disk device which permits selecting the decelerating method with low power consumption when rapid deceleration is not required and permits stopping the disk rapidly and reliably even if need arises for stopping the disk during the deceleration of the disk by the method with the low power consumption.

In order to solve the above problems, the present invention is a disk device having a function of decelerating or stopping a rotating disk wherein a disk motor which rotates the disk selectively carries out a forced decelerating and stopping operation by applying a reverse-direction voltage in order to forcedly decelerate or stop the disk, or a power saving decelerating and stopping operation with lower power consumption than that for the forced decelerating and stopping operation, depending upon the kind of a command at the time of the deceleration or stop. It is also characterized in that when the disk is to be stopped by the power saving decelerating and stopping operation, a reverse-direction voltage is applied for a certain time to reliably stop the disk after a rotational speed of the disk reaches a certain number of rotation. This permits selecting the power saving decelerating and stopping method with low power consumption when the rapid deceleration is not required and permits stopping the disk promptly and reliably even when a need arises for stopping the disk during the deceleration of the disk by the method with low power consumption.

Further, by selectively switching, according as required, between a short-circuit brake which is capable of deceleration at a higher speed, and an inertial rotation which requires longer time for deceleration but generates less heat in motor driving means, as the power saving decelerating and stopping operation, an appropriate decelerating method can be selected in correspondence to each requirement for suppressing heat generation or operating a rapid deceleration.

The invention according to claim 1 is a disk device having a function of decelerating or stopping a rotating disk, comprising: controlling means for switching, depending on the kind of a command upon decelerating or stopping, between carrying out a forced deceleration or stop operation by applying a reverse-directional voltage to a disk motor which rotates the disk so as to forcedly decelerate or stop the disk, and carrying out a power saving deceleration or stop operation with lower power consumption than the forced deceleration or stop operation so as to decelerate or stop the disk.

The invention according to claim 2 is a disk decelerating and stopping method of a disk device which decelerates or stops a rotating disk, comprising selectively switching, depending on the kind of a command upon decelerating or stopping, between carrying out a forced deceleration or stop operation by applying a reverse-directional voltage to a disk motor which rotates the disk so as to forcedly decelerate or stop the disk, or carrying out a power saving deceleration or stop operation with lower power consumption than the forced deceleration or stop operation so as to decelerate or stop the disk.

According to the disk device and disk decelerating and stopping method of the disk device, when the rapid deceleration or stop of the disk is not required, the method with lower power consumption is selected to decelerate and stop the rotation of the disk, so that the rotation of the disk can be decelerated or stopped without consuming extra power.

The invention according to claim 3 is the disk device according to claim 1, wherein upon decelerating or stopping the disk by the power saving deceleration or stop operation, the controlling means controls instruction commanding means which commands the deceleration or stop of the disk to immediately return a response of completion of command execution.

The invention according to claim 4 is the disk decelerating and stopping method of the disk device according to claim 2, wherein upon decelerating or stopping the disk by the power saving deceleration or stop operation, a response of completion of command execution is immediately returned to instruction commanding means which commands the deceleration or stop of the disk.

According to the disk device and disk decelerating and stopping method of the disk device, when the rapid deceleration or stop of the disk is not required, the method with lower power consumption is selected to decelerate and stop the rotation of the disk, so that the rotation of the disk can be decelerated or stopped without consuming extra power, and even if the power saving decelerating and stopping operation is selected, a waiting time for the command completion can be reduced.

The invention according to claim 5 is the disk device according to claim 1 or 3, wherein the disk device further comprises means for carrying out a short-circuit brake by bringing input terminals of a motor coil in the disk motor into a short-circuit condition and utilizing a reverse electromotive force of the motor coil in order for the deceleration or stop of the disk, and the controlling means performs the power saving deceleration and stop operation by carrying out the short-circuit brake.

The invention according to claim 6 is the disk decelerating and stopping method of the disk device according to claim 2 or 4, wherein the power saving decelerating and stopping operation is carried out by performing a short-circuit brake by bringing input terminals of a motor coil in the disk motor into a short-circuit condition and utilizing a reverse electromotive force of the motor coil in order for the deceleration or stop.

According to the disk device and disk decelerating and stopping method of the disk device, the power saving decelerating and stopping operation is carried out by performing the short-circuit brake, so that the rotation of the disk can be decelerated or stopped without consuming extra power.

The invention according to claim 7 is the disk device according to claim 1 or 3, wherein the disk device further comprises means for inertially rotating the disk so as to be decelerated or stopped by friction during rotation, and the controlling means performs the decelerating or stopping operation by the inertial rotation of the disk as the power saving decelerating and stopping operation.

The invention according to claim 8 is the disk decelerating and stopping method of the disk device according to claim 2 or 4, wherein the power saving decelerating and stopping operation is carried out by inertially rotating the disk so as to be decelerated or stopped by friction generated during the rotation.

According to the disk device and disk decelerating and stopping method of the disk device, when the rapid deceleration or stop is not required, the rotation of the disk can be decelerated or stopped without consuming extra power by inertially rotating the disk.

The invention according to claim 9 is the disk device according to claim 1 or 3, wherein the disk device further comprises means for carrying out a short-circuit brake by bringing input terminals of a motor coil in the disk motor into a short-circuit condition and utilizing a reverse electromotive force of the motor coil in order for the deceleration or stop of the disk, and means for inertially rotating the disk so as to be decelerated or stopped by friction generated during the rotation, and the controlling means selectively switches between the short-circuit brake and the inertial rotation of the disk as the power saving deceleration or stop operation to be performed.

The invention according to claim 10 is the disk decelerating and stopping method of the disk device according to claim 2 of 4, wherein the power saving deceleration or stop operation is carried out by selectively switching between a method using a short-circuit brake by bringing input terminals of a motor coil in the disk motor into a short-circuit condition and utilizing a reverse electromotive force of the motor coil in order for the deceleration or stop of the disk, and a method of inertially rotating the disk so as to be decelerated or stopped by friction generated during the rotation.

According to the disk device and disk decelerating and stopping method of the disk device, when the rapid deceleration or stop is not required, the short-circuit brake which is capable of deceleration at a higher speed but involves heat generation or the inertial rotation which requires time for deceleration but reduces heat generation can be selected so that the extra power or heat generation can be suppressed to decelerate or stop the rotation of the disk.

The invention according to claim 11 is the disk device according to claim 7 or 9, wherein the controlling means inertially rotates the disk to be decelerated to a predetermined rotational speed by the friction during the rotation and then applies the reverse-direction voltage for a certain period of time to stop the disk as the power saving deceleration and stop operation.

The invention according to claim 12 is the disk decelerating and stopping method of the disk device according to claim 8 to 10, wherein the power saving deceleration and stop operation is carried out by inertially rotating the disk to be decelerated to a predetermined rotational speed by the friction during the rotation and then applying the reverse-direction voltage for a certain period of time to stop the disk.

According to the disk device and disk decelerating and stopping method of the disk device, the disk can be reliably stopped even if the disk is stopped by the power saving decelerating and stopping operation with low power consumption.

The invention according to claim 13 is the disk device according to claim 11, wherein the disk device further comprises disk weight coefficient measuring means for measuring the weight coefficient of the disk, and a standard of the voltage and time for applying the reverse-direction voltage for a certain period of time is determined based on a measured result by the measuring means.

The invention according to claim 14 is the disk decelerating and stopping method of the disk device according to claim 12, wherein a disk weight coefficient is measured and a standard of the voltage and time for applying the reverse-direction voltage for a certain period of time is determined based on a measured result of the disk weight coefficient.

According to the disk device and disk decelerating and stopping method of the disk device, the disk can be reliably stopped even if the disk with different weight is used when the disk is stopped by the method with low power consumption.

The invention according to claim 15 is the disk device according to any one of claims 1, 3, 5, 7, 9, 11 and 13, wherein when a command is received during the power saving deceleration or stop operation, the controlling means determines, depending on the kind of the command, whether the disk is required to be decelerated from the current speed or stopped in order for executing the command, and if it is determined that the deceleration or stop is required, the controlling means selectively switches either to apply the reverse-direction voltage in order for the forced deceleration or stop, or to decelerate or stop by the power saving deceleration or stop operation.

The invention according to claim 16 is the disk decelerating and stopping method of the disk device according to any one of claims 2, 4, 6, 8, 10, 12 and 14, wherein when a command is received during the power saving deceleration or stop operation, the controlling means determines, depending on the kind of the command, whether the disk is required to be decelerated from the current speed or stopped in order for executing the command, and if it is determined that the deceleration or stop is required, the controlling means selectively switches either to apply the reverse-direction voltage in order for the forced deceleration or stop, or to decelerate or stop by the power saving deceleration or stop operation.

According to the disk device and disk decelerating and stopping method of the disk device, when the rapid deceleration or stop is not required, the power saving decelerating and stopping operation with the low power consumption is selected to decelerate or stop the rotation of the disk so that no extra power is consumed and that the rapid deceleration and stop can be carried out if needs for the rapid deceleration or stop during the deceleration or stop by the power saving decelerating and stopping operation.

The invention according to claim 17 is the disk device according to any one of claims 1, 3, 5, 7, 9, 11, 13 and 15, wherein the disk device further comprises storing means for temporarily storing a certain amount of read data, and in case of receiving a command to read the data stored in the storing means upon decelerating the disk by the power saving decelerating and stopping operation, even if another command is issued thereafter to forcedly decelerate the disk, the controlling means controls not to forcedly decelerate the disk until reading of the data has been completed.

The invention according to claim 18 is the disk decelerating and stopping method of the disk device according to any one of claims 2, 4, 6, 8, 10, 12 and 14, wherein the disk device temporarily stores a certain amount of read data in storing means, and in case of receiving a command to read the data stored in the storing means upon decelerating the disk by the power saving decelerating and stopping operation, even if another command is issued thereafter to forcedly decelerate the disk, the disk is not forcedly decelerated until reading of the data has been completed.

According to the disk device and disk decelerating and stopping method of the disk device, when the rapid deceleration or stop is not required, the power saving decelerating and stopping operation with low power consumption is selected to decelerate or stop the rotation of the disk so that the rotation of the disk is decelerated or stopped without consuming extra power and the data can be reliably read.

The invention according to claim 19 is the disk device according to any one of claims 1, 3, 5, 7, 9, 11, 13 and 15, wherein the disk device is a disk reproducing device which comprises a function of reproducing voice or image data of a CD-ROM, a DVD-ROM device, or the like to be directly output and a function of externally outputting the data read from a recording medium via interface means, and wherein specified commands at the time of the forcedly decelerating and stopping operation include a command to reproduce the voice or image data to be directly output, a command to externally output the data read from the disk via the interface means, and a disk ejecting command.

According to the disk device and disk decelerating and stopping method of the disk device, when the rapid deceleration or stop is not required, the power saving decelerating and stopping operation with low power consumption is selected to decelerate or stop the rotation of the disk so that the rotation of the disk is decelerated or stopped without consuming extra power.

As described above, according to the present invention, when the rapid deceleration or stop of the disk is not required depending on the kind of the command during execution of decelerating or stopping the rotational speed of the disk, the power saving decelerating and stopping operation with low power consumption is selected to decelerate or stop the rotation of the disk, so that the extra power consumption and heat generation can be suppressed. Especially when driving a portable computer provided with a CD-ROM, a DVD-ROM or the like by a battery, the driving time can be extended longer. When the rapid deceleration or stop of the disk is not required in decelerating or stopping the rotation of the disk, the disk motor is not forcedly braked, resulting in extension of the service life of the disk motor.

Further, when the disk is decelerated or stopped by the power saving decelerating and stopping operation, a response of completion of the command execution is immediately returned to the instruction commanding means so that the host computer which commands the deceleration or stop can reduce the waiting time for the command completion as compared with the case where the response of the command completion is returned after having waited for the stopping operation by the power saving decelerating and stopping operation.

The power saving decelerating and stopping operation is executed by applying a reverse-direction voltage to the disk for a certain time after the disk has been inertially rotated and decelerated to a predetermined rotational speed by friction during the rotation, thus allowing the disk to be reliably stopped even when the disk is stopped by the power saving decelerating and stopping operation with lower power consumption.

BRIEF DESCRIPTION OF DRAWINGS

FIG. 2 is a block diagram showing a conventional disk reproducing device.

BEST MODE FOR CARRYING OUT THE INVENTION

Figure 1:
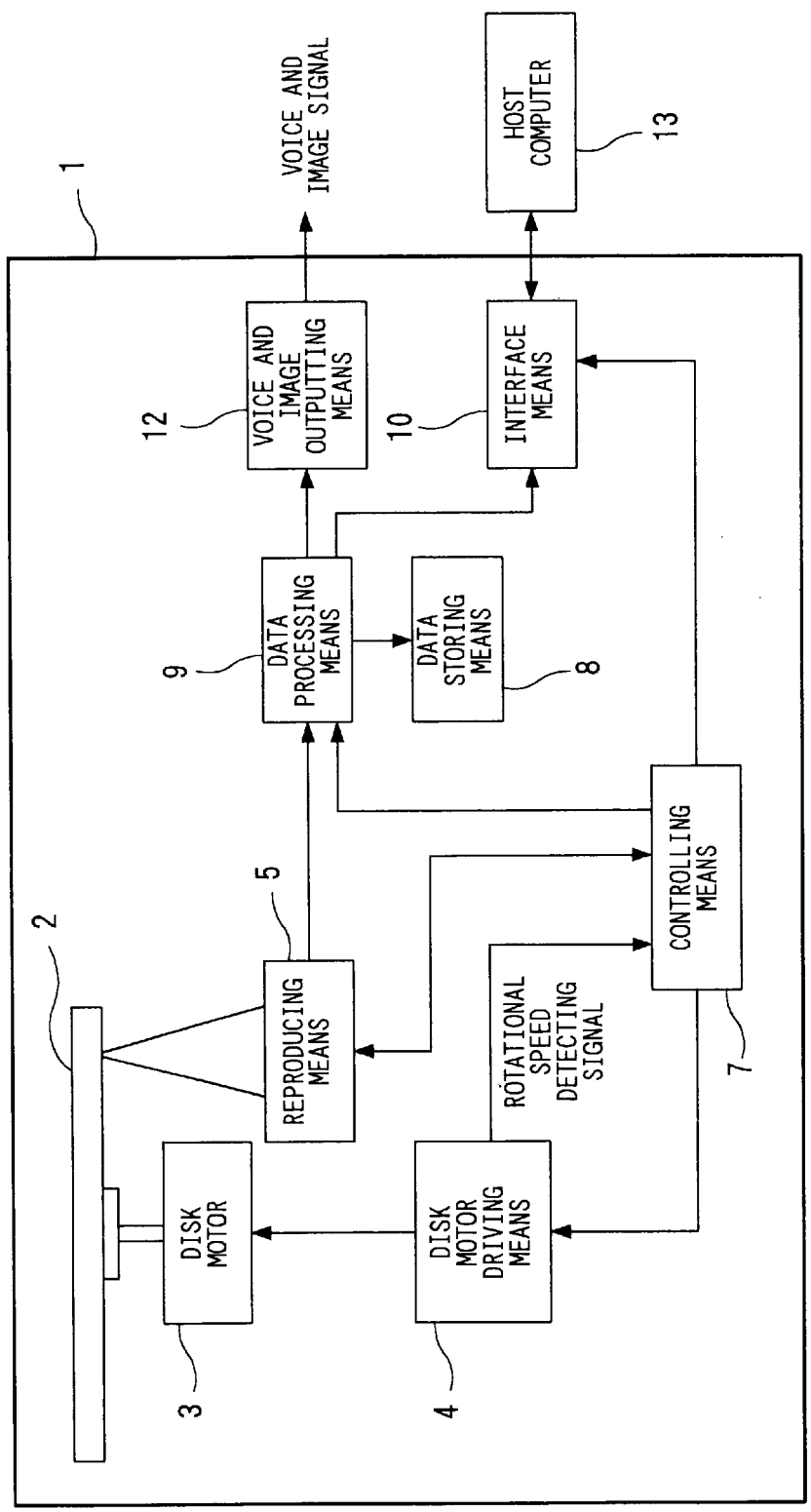
FIG. 1 is a block diagram showing an embodiment of the present invention applied to an optical disk reproducing device.

Embodiments of the present invention will be described below with reference to FIG. 1.

FIG. 1 is a block diagram showing a case where the present invention is applied to an optical disk reproducing device, and reference numeral 1 denotes a disk device. Reference numeral 2 denotes a disk which is a recording medium in a disk shape, for example, an optical disk, a magnetic disk, magnetic optical disk and the like, which is inserted from the outside to inside of the disk device 1 and rotated by a disk motor 3. Reference numeral 4 denotes disk motor driving means, which receives a rotating command from a controlling means 7 and has the disk motor 3 carry out operation such as rotation, acceleration, deceleration and stop according to need. Added to the disk motor driving means 4 is a function-of detecting rotational speed of the disk 2 to be output to the controlling means 7. Reference numeral 5 denotes a reproducing device, which is composed of, for example, an optical pickup, a magnetic head and the like, a head amplifier and signal processing circuit, and reproduces a signal of the disk 2 and sends the same to data processing means 9.

When the kind of recorded data is such as voice data or image data recorded in a format which can be directly reproduced by the disk device 1 and when the disk device 1 receives a command to reproduce these data from a host computer 13, the data processing means 9 processes the read data and outputs the same to the outside of the disk device 1 via voice and image outputting means 12. Reproduction of the voice and image signals includes a case of reproducing all the data at a predetermined speed of reproducing the data required for reproducing the voice and image and a case of reading the data at a higher speed than this, sending the data stored in the data storing means 8 in turn to the voice and image outputting means 12 to output the same to the outside of the disk device 1. In each case, the highest reproducing speed of the disk device 1 is far higher than the reproducing speed of the voice and image signals so that in most cases, reading is carried out at a lower speed than the highest reproducing speed.

When the command to transmit the recorded data to the host computer 13 via the interface means 10, the data processing means 9 temporarily stores the data in the data storing means 8 and carries out processes such as error correcting or descrambling, and transmits the processed data to the host computer 13 via the interface means 10.

Next, the disk decelerating and stopping method which decelerates or stops the rotation of the disk 2 will be described.

When need arises to decelerate or stop the rotational speed of the disk, the controlling means 7 selects, depending upon the kind of the command which is currently executed, the decelerating and stopping method by forcedly decelerating and stopping operation in which an reverse voltage is applied to the disk motor 3 for forced deceleration or stop, or the decelerating and stopping method by power saving decelerating and stopping operation with a power consumption lower than that of the forcedly decelerating and stopping operation. Adopted as the power saving decelerating and stopping operation are a short-circuit brake that a short-circuit is caused across the terminals of a motor coil of the disk motor 3 to carry out the deceleration or stop using a reverse electromotive voltage of the disk motor 3, or a method of inertially rotating the disk 2 to be gradually stopped only by friction. Alternatively, a decelerating and stopping method by plural kinds of power saving decelerating and stopping operations may be prepared for further selectively switching the plural kinds of power saving decelerating and stopping operations depending upon urgency of the deceleration of the rotational speed of the disk by the command under execution.

The commands to apply the reverse voltage to the disk motor 3 for the forced deceleration or stop include, for example, a data reading command which requires to return the data as soon as possible, a voice and image reproducing command which requires to output the voice and image signal as soon as possible, and a disk ejecting command for stopping the rotation of the disk 2 rapidly and reliably to be ejected to the outside of the device. On the other hand, the cases of selecting the decelerating and stopping method with the power saving decelerating and stopping operation include, for example, a case of receiving a command to stop the operation of the drive to shift to a low power consumption mode, a case of having received no command and shifting to the low rotation mode when the drive receives no command for a certain time, and a case of receiving no command for a certain time and where the drive spontaneously stops the operation and shifts to the low power consumption mode. When any one of these commands is received depending upon the kind of the disk device 1, the reproducing speed of the data and the like, the deceleration and stop may be carried out by the power saving decelerating and stopping operation, and when commands other than those are received, the reverse voltage may also be applied to carry out the forced deceleration. In short, it is sufficient to consider the need of the rapid deceleration or stop, power consumption of the drive, heat generation and the like depending upon the kind of the disk device 1, rotational speed of the disk 2 and the kind of the command, and to select any decelerating and stopping operation.

Next, operation at the time that the rotation of the disk is stopped by the decelerating and stopping method with the power saving decelerating and stopping operation.

When the inertial rotation is selected as the decelerating and stopping method with the power saving decelerating and stopping operation, the rotational speed is slowly decelerated by the friction. The stop of the rotation may be waited for as it is slowly without consuming any power, or the reverse-direction voltage may be applied to the disk motor 3 for a certain time to reliably stop the rotation at the time of having been decelerated to reach a certain rotational speed. Adopting this method reliably achieves the stop of the disk 2 with the low power consumption since the rotational speed of the disk 2 is sufficiently reduced when applying the reverse-direction voltage to the disk motor 3. The voltage and time for applying the reverse-direction voltage is desirably determined based on coefficient of weight of the disk 2 measured in advance. Measuring manners of the weight coefficient of the disk 2 include a measuring manner based on change of the speed of the disk in case of issuing an accelerating command for a certain time and at a certain voltage during the acceleration of the disk and a measuring manner based on time before a certain speed is reached by continuously applying a certain voltage. The measurement at each time of insertion of the disk permits accommodating variation of the disk weight, variation of such as a power supply voltage of the drive and the disk motor to reliably achieve the stop of the disk 2.

When the short-circuit brake is selected as the decelerating and stopping method with the power saving decelerating and stopping operation, the same operation as in the inertial rotation is made to be carried out. This covers the problem that the reduction of the rotational speed of the disk motor 3 reduces the reverse electromotive force as well as the braking force since the short-circuit brake utilizes the reverse electromotive force of the disk motor 3.

When the rotation of the disk is decelerated or stopped by the decelerating and stopping method with the power saving decelerating and stopping operation, generally, it often takes longer time than in applying the reverse voltage to the disk motor 3 for the deceleration or stop. When the disk device 1 is connected to the host computer 13 via the interface means 10, the host computer 13 issues the decelerating or stopping command to the disk device 1, and then waits for a response of completion of the deceleration or stop and is sometimes on standby without being able to issue a new command. Considering such a case, when the rotation of the disk is decelerated or stopped by the power saving decelerating and stopping operation and when it is expected to take time before its completion, the disk device 1 desirably receives the disk decelerating or stopping command from the host computer 13 and returns the response of the command completion at the time of a start of the deceleration or stop.

Next, the operation at the time that other command is received during the deceleration or stop of the rotational speed of the disk by the power saving decelerating and stopping operation will be described.

The basic operation is the same also in the case where the other command is received during the deceleration or stop. That is, the method of changing the rotational speed of the disk is selected depending upon the kind of the command newly received.

For example, when the disk ejecting command is received during the decelerating or stopping operation, the need arises to rapidly stop the rotation of the disk 2 and eject the disk 2. In such a case, it is desirable to switch to the method of applying the reverse voltage to the disk motor 3 for the rapid deceleration. However, for the equipment which gives priority to the low power consumption, a method of stopping the disk 2 more rapidly than other power saving decelerating and stopping operations, for example, a method of decelerating to a certain rotational speed by the short-circuit brake and then applying the reverse-direction voltage for the rapid deceleration can be selected.

When, for example, the data reading command is received, the following operation is taken.

Generally, in the disk reproducing device, especially a CD-ROM or DVD-ROM device, the rotational speed of the disk 2 is sometimes changed depending upon the kind of the read data. For example, the data of the kind including information on error correction of a higher level is rotated and reproduced at the highest speed of the system and the data including information on error correction of a lower level is rotated and reproduced at a lower speed than the highest speed of the system, and the data such as of audio or image, which has a fixed reproducing speed and is not required to be read at the high speed if the reproducing speed is higher than a certain speed, is rotated and reproduced at a further lowered reproducing speed.

When these data reproducing commands are received during the deceleration and stop, the current rotational speed of the disk is detected and the acceleration or deceleration is carried out to the target speed. In the case where the deceleration is required, similarly to the case of ejecting the disk described in the former example, the method of switching between the method of applying the reverse voltage to the disk motor 3 for forced deceleration and the method of decelerating the disk more rapidly than other decelerating methods with lower power consumption is adopted.

Generally, the disk device 1 has the data storing means 8 for temporally storing the read data. This serves to temporarily store the read data, and after processing of the error correction or the like, send the processed data to the host computer 13 via the interface means 10. When the command to read the data which remains in the data storing means 8 and has been already read during the operation of the deceleration or stop of the rotation of the disk, it is sufficient that the decelerating or stopping operation of the disk 2 is continued by the method with lower power consumption as it is and that the data in the data storing means 8 is sent to the host computer 13 as it is via the interface means 10. This reliably achieves reading the data since the disk 2 is not forcedly decelerated before the completion of reading the data even if there is the command to forcedly decelerate the disk 2 after receiving the data reading command stored in the data storing means 8.

What is claimed is:

1. A disk drive device for decelerating or stopping a rotating disk, said disk device comprising:

controlling means for selectively switching, depending on a first or second command provided to the disk drive device for decelerating or stopping a disk, said first command for causing a forced deceleration or stop operation by applying a reverse-directional voltage to a disk motor which rotates a disk to decelerate forcefully or stop the disk, and said second command for causing a power saving deceleration or stop operation, wherein the power saving deceleration or stop operation requires less power consumption than the forceful deceleration or stop operation, for decelerating or stopping a disk.

2. A disk decelerating or stopping method of a disk drive device which decelerates or stops a rotating disk, said method comprising:

selectively switching, depending on a first or second command provided to the disk drive device when a disk is decelerating or stopping, said first command for causing a forced deceleration or stop operation by applying a reverse-directional voltage to a disk motor which rotates a disk to decelerate forcefully or stop a disk, and said second command for causing a power saving deceleration or stop operation, wherein the power saving deceleration or stop operation requires less power consumption than the forceful deceleration or stop operation, for decelerating or stopping a disk.

3. The disk drive device according to claim 1, wherein upon decelerating or stopping a disk by the power saving deceleration or stop operation, the controlling means is for controlling instruction commanding means which is for commanding the deceleration or stop operation of a disk to immediately return a response of completion of command execution.

4. The disk decelerating and stopping method of the disk drive device according to claim 2, wherein upon decelerating or stopping a disk by the power saving deceleration or stop operation, further comprising immediately returning a response of completion of command execution to an instruction commanding means which is for commanding the deceleration or stopping of a disk.

5. The disk drive device according to claim 1, wherein the disk drive device further comprises means for carrying out a short-circuit brake by connecting input terminals of a motor coil in the disk motor in a short-circuit connection and by utilizing a reverse electromotive force of the motor coil for decelerating or stopping a disk, and the controlling means for causing the power saving deceleration and stop operation by carrying out said short-circuit brake.

6. The disk decelerating and stopping method of the disk drive device according to claim 2, wherein the power saving decelerating and stopping operation comprises short-circuit braking by connecting input terminals of a motor coil in the disk motor in a short-circuit connection and utilizing a reverse electromotive force of the motor coil for causing the deceleration or stop operation.

7. The disk device according to claim 1, wherein the disk drive device further comprises means for inertially rotating a disk to be decelerated or stopped by friction during rotation, and the controlling means is for causing the decelerating or stopping operation by the inertial rotation of said disk as the power saving decelerating and stopping operation.

8. The disk decelerating and stopping method of the disk drive device according to claim 2, wherein the power saving decelerating and stopping operation is carried out by inertially rotating a disk for decelerating or stopping the rotating disk by friction generated during the rotation.

9. The disk device according to claim 1, wherein the disk drive device further comprises means for carrying out a short-circuit brake by connecting input terminals of a motor coil in the disk motor in a short-circuit connection and utilizing a reverse electromotive force of the motor coil for decelerating or stopping a disk, and means for inertially rotating a disk for decelerating or stopping the rotating disk by friction generated during the rotation, and the controlling means for selectively switching between said short-circuit brake and the inertial rotation of said disk according to the power saving deceleration or stop operation to be performed.

10. The disk decelerating and stopping method of a disk drive device according to claim 2, wherein the power saving deceleration or stop operation is carried out by selectively switching between using a short-circuit brake by connecting input terminals of a motor coil in the disk motor in a short-circuit connecting and utilizing a reverse electromotive force of the motor coil for decelerating or stopping a disk, and a method of inertially rotating a disk so as to be decelerated or stopped by friction generated during the rotation.

11. The disk drive device according to claim 7, wherein the controlling means is for inertially rotating a disk to be decelerated to a predetermined rotational speed by friction during the rotation and then for applying the reverse-direction voltage for a certain period of time to stop a disk as the power saving deceleration and stop operation.

12. The disk decelerating and stopping method of the disk drive device according to claim 8, wherein the power saving deceleration and stop operation is carried out by inertially rotating a disk to be decelerated to a predetermined rotational speed by friction during the rotation and then applying the reverse-direction voltage for a certain period of time to stop a disk.

13. The disk device according to claim 11, wherein the disk drive device further comprises measuring means for measuring the actual weight of a disk, and a standard of the voltage and time for applying the reverse-direction voltage for a certain period of time is determined based on a measured result by said measuring means.

14. The disk decelerating and stopping method of the disk drive device according to claim 12, wherein an actual weight of a disk is measured and a standard of the voltage and time for applying the reverse-direction voltage for a certain period of time is determined based on a measured result of said disk weight coefficient.

15. The disk drive device according to claim 1, wherein when a command is received during the power saving deceleration or stop operation, the controlling means determines, depending on the command, whether a disk is required to be decelerated from the current speed or stopped to execute the command, and if deceleration or a stop operation is required, the controlling means is for selectively switching either to apply the reverse-direction voltage for the forced deceleration or stop operation, or to decelerate or stop a rotating disk by the power saving deceleration or stop operation.

16. The disk decelerating and stopping method of the disk drive device according to claim 2, wherein when a command is received during the power saving deceleration or stop operation, the controlling means determines, depending on the command, whether a disk is required to be decelerated from the current speed or stopped to execute the command, and if it is determined that the deceleration or stop operation is required, the controlling means is for selectively switching either to apply the reverse-direction voltage for the forced deceleration or stop operation, or to decelerate or stop a rotating disk by the power saving deceleration or stop operation.

17. The disk device according to claim 1, wherein said disk drive device further comprises storing means for temporarily storing read data, and when receiving a command to read the data stored in said storing means while the power saving decelerating and stopping operation decelerates a disk, even if another command is issued thereafter to decelerate forcefully a disk, the controlling means is for controlling the disk drive device to not forcefully decelerate a disk until reading of the data has been completed.

18. The disk decelerating and stopping method of the disk drive device according to claim 2, wherein said disk device temporarily stores read data in storing means, and when receiving a command to read the data stored in said storing means upon decelerating a disk by the power saving decelerating and stopping operation, even if another command is issued thereafter to decelerate forcefully a disk, a disk is not forcefully decelerated until reading of the data has been completed.

19. The disk device according to claim 1, wherein the disk drive device is a disk reproducing device comprising:

a module for reproducing voice or image data of a CD-ROM or a DVD-ROM device;

an output module for externally outputting the data read from a recording medium via interface means, wherein commands specified at the time of the forcefully decelerating and stopping operation include a command to reproduce said voice or image data, a command to externally output the data read from a disk via the interface means, and a disk ejecting command.

* * * * *